3,054,652
ISOTACTIC POLYPROPYLENE MELT SPINNING PROCESS

Walter Edward Heumann, Jersey City, N.J., assignor to Esso Research and Engineering Company, a corporation of Delaware
No Drawing. Filed Aug. 28, 1957, Ser. No. 680,680
3 Claims. (Cl. 18—54)

This invention relates to an improvement in fibers or monofilaments derived from plastic polymers of propylene. More particularly it relates to polypropylene fibers of high tenacity and to a process for preparing such improved fibers from high-density polypropylene.

In the last few years so-called "low-pressure," high-density polypropylene has been attracting increasing attention as a highly versatile plastic. Because of its attractive balance of properties its use as a fiber-forming material has been suggested. As is well known, "low-pressure" polypropylene plastic of desirably high molecular weight is readily obtained by polymerizing propylene at atmospheric or moderately superatmospheric pressure with the aid of a Ziegler catalyst such as the reaction product of titanium tetrachloride or trichloride and aluminum triethyl. However, one of the drawbacks of fibers prepared from polypropylene has been their relatively low tenacity.

It is an object of the present invention to provide improved polypropylene fibers. A more specific object is to convert "low-pressure," high-density polypropylene into fibers possessing superior tenacity and satisfactory knot strength. A still further object is to provide a process for making such imposed hydrocarbon fibers in a simple and economical manner. These and other objects, as well as the nature and advantages of the invention will become more clearly apparent from the subsequent description. In this description it should be understood that all amounts and proportions of materials are expressed on a weight basis unless otherwise indicated.

It has now been discovered that the desired improvement in tenacity can be achieved by extruding isotactic polypropylene possessing a density of at least 0.890 and preferably 0.90 to 0.95 or more g./cc. and orienting the monofilament in a gaseous medium at an elevated temperature, preferably after intervening cooling of the extruded filament. The gas medium can be steam, air, carbon dioxide, nitrogen, argon, or any other gas that is inert with respect to the hydrocarbon fiber at the prevailing orientation temperature.

The isotactic propylene polymer suitable for the present purposes is typically characterized by a molecular weight of about 50,000 to 500,000 (Harris correlation, J. Polymer Science, 8, 361, 1952), a crystallinity of 40 to 95%, preferably 60 to 90%, density of about 0.89 to 0.95, preferably between 0.90 and 0.95, high softening point (115°–145° C.), high melting point (125°–165° C.), high tensile strength (1,000 to 5,500 p.s.i.), high rigidity at low temperature (1,000,000 to 6,000,000 p.s.i. at −50° C.), good stress cracking resistance, a steep melt viscosity-temperature relationship, etc. This material, as is well known, can be prepared by polymerizing propylene at or near atmospheric pressure with the aid of a Ziegler polymerization catalyst, e.g., as described in Belgian Patent 538,782. For the sake of convenience the essential features of this known Ziegler-type polymerization process will be briefly recapitulated.

The Ziegler catalyst is an insoluble solid which can be obtained by reducing a reducible compound of a group IVB–VIB or VIII heavy transition metal or manganese, etc., with a reducing organometallic compound of an alkali, alkaline earth, earth, rare earth or zinc metal compound, or by reducing an appropriate metal compound with the aid of metallic aluminum, or a mixture of aluminum and titanium, metal hydrides, etc. The preferred catalyst of this type is usually prepared by reducing 1 mole of a titanium tetrahalide, notably tetrachloride, to the corresponding trivalent or subtrivalent titanium halide with about 0.2 to 6 moles of aluminum triethyl, triisobutyl or other aluminum alkyl compound of the formula RR'AlX. In this formula R, R' and X preferably are alkyl groups of 2 to 8 carbon atoms, although X may alternatively be hydrogen or a halogen, notably chlorine.

The catalyst reduction is best carried out by dissolving each of the two catalyst components in an inert solvent, notably a $C_3$ to $C_{18}$ paraffin such as isopentane or n-heptane, and mixing the two solutions in the proper proportions at temperatures between 0° and 150° C. and in the absence of moisture, oxygen, and sulfur impurities. The resulting precipitate in conjunction with some free aluminum alkyl compound is generally considered to constitute the actual active polymerization catalyst. Consequently, it has been considered best to carry out the catalyst preparation using only about 0.3 to 0.8 mole of the aluminum alkyl compound per mole of titanium chloride, and then add a supplemental amount of the aluminum alkyl compound to the polymerization zone to raise the Al/Ti mole ratio therein to a value between about 1:1 and 3:1. Another increasingly popular polymerization catalyst comprises separately preformed titanium trichloride activated with one of the aluminum alkyl compounds such as aluminum triethyl.

Propylene monomer is contacted with the polymerization catalyst in the presence of their inert hydrocarbon solvent such as isopentane, n-heptane, xylene, etc. The polymerization is conveniently effected at temperatures of about 0° to 100° C. and pressures ranging from about 0 to 500 p.s.i.g., usually 0 to 50 p.s.i.g. The catalyst concentration in the polymerization zone is preferably in the range of about 0.1 to 0.5%, based on total liquid, and the polymer product concentration in the polymerization zone is preferably kept between about 2 to 25% based on total contents so as to allow easy handling of the polymerized mixture. The proper polymer concentration can be obtained by having enough of the inert diluent present or by stopping the polymerization short of 100% conversion, etc. When the desired degree of polymerization has been reached a $C_1$ to $C_8$ alkanol such as methanol or n-butyl alcohol, desirably in combination with a chelating agent such as acetyl acetone, is normally added to the reaction mixture for the purpose of dissolving and deactivating the catalyst and for precipitating the polymer product from solution. After filtration, the solid polymer may be further washed with alcohol or acid, such as hydrochloric acid, dried, compacted and packaged.

Instead of using straight polypropylene, similar fibers can also be made from fiber-forming propylene polymers containing minor amounts of ethylene or butene.

In carrying out the present invention the propylene polymer is melted and extruded at a temperature of 200° to 300° C. through spinnerets in an otherwise well-known manner, thus forming monofilaments having a diameter governed by the size of the spinneret orifice. Accordingly, depending on intended use, the fibers may be prepared in sizes that may range from relatively coarse filaments of 15 mils oriented thickness, e.g. when intended for fishing lines or the like, down to 1 mil or less. Of course, the diameter of the initial extruded filament undergoes a substantial reduction during take-up and orientation. For instance, a filament may be reduced to about 50–75% of its initial extruded thickness when first cooled and taken up, and reduced further during the orientation step to perhaps 20–40% of its original thickness. Thus, a filament extruded through a 35-mil diameter orifice may be reduced to a thickness of 20–25 mils when cooled and taken up, and may finally be reduced to a diameter of 8 to 10 mils when cold drawn or oriented.

In actual operation the hot melt is extruded into filaments which pass through a tube maintained at a constant temperature, e.g. from −30° to +30° C. This temperature is kept constant by circulating cooled air or other gas through one end and out the other end of the tube, and the filaments are taken up on a fixed speed take-up roll. The filaments are then cold drawn (oriented) by having a second take-up roll traveling at a fixed but more rapid speed, e.g. 6 to 9 times faster than the first one. In between these take-up rolls the filament passes through a gaseous medium in a tube maintained at a temperature between about 65° and 120° C., preferably 80° to 105° C. The elevated temperature is controlled by circulating air, steam or other inert medium from a heat source at the proper temperature through the tube. The fiber is thus elongated from 600 to 900% of its original length as it is drawn in the hot gas between two rolls. The oriented fiber is then weighed to obtain the denier, and tensile tests are performed to determine its tenacity.

EXAMPLES

The following specific examples further illustrate the operation and advantages of this invention. The polypropylene used in these tests had the following characteristics:

| | |
|---|---|
| Density _____ g./cc._ | 0.901 |
| Wt. percent heptane, insoluble _____ percent__ | 80 |
| Intrinsic viscosity _____ | 2.73 |
| Softening melting points _____ ° C.__ | 160/166 |
| Tensile strength _____ p.s.i.__ | 3760 |
| Ultimate elongation _____ percent__ | 100 |
| Apparent modulus of elasticity, p.s.i. $\times 10^{-5}$ at 25° C. _____ | 1.94 |
| Melt index at 190° C. _____ | 0.16 |
| Wt. percent oxide ash _____ | 0.03 |

This polymer was made with $TiCl_3$ catalyst preformed by reducing $TiCl_4$ with aluminum and titanium metal. The resulting $TiCl_3$ was activated in the polymerization reaction by addition of aluminum triethyl.

Polymerization conditions:

| | |
|---|---|
| Cat. conc., wt. percent _____ | 0.3 |
| $AlEt_3/TiCl_3$ ratio _____ | 2.0 |
| Temperature, ° C. _____ | 72 |
| Cat. efficiency, g. pol./g. cat. _____ | 135 |

Granules of the above-described polypropylene were fed to a one-inch extruder maintained at a cylinder temperature of 230° C. A screw speed of 10 r.p.m. was maintained for all runs. The hot melt was extruded through an orifice of 35 mils diameter forming a single monofilament approximately 35–40 mils thick upon emergence from the die. The first take-up roll was maintained at a speed to reduce the filament diameter to approximately 20–25 mils thickness. Between the extruder and the first take-up roll the monofilament was cooled by passing through a vertically placed cooling tube which was maintained at constant temperature by passing cooled gas from the bottom to top of the tube. A cooling coil in Dry Ice and isopropanol was used for a cooling source. The monofilament was cooled to a temperature approximately equal to the incoming cold gas stream before being wound on the first take-up roll. A second take-up roll was maintained at a faster speed in order to cold draw (orient) the fiber from 600 to 900% of its original length. Between the two take-up rolls was a heating tube. This tube was maintained at the various temperatures given in the data by heating air or gas and passing it through the tube. Steam was also passed through the tube for some of the runs giving a temperature approximately of 200° F. The oriented fiber was then unrolled from the second take-up roll and tested for tensile strength and elongation on an inclined plane Scott tensile testing machine having grips especially adapted for fiber testing.

The data obtained are summarized in Table I.

*Table I*

EFFECT OF COOLING AND ORIENTATION TEMPERATURES ON TENACITY

| Test No. | Conditions | Percent Cold Drawn | Tenacity, gms./denier | Elongation at Break (Percent) |
|---|---|---|---|---|
| 1 | Cooled with $N_2$ at −29° F.; Steam Oriented at 20° F. | 790 | 7.38 | 33 |
| 2 | Cooled with $N_2$ at −20° F.; Hot Air Oriented at 200° F. | 790 | 7.52 | 39 |
| 3 | Cooled with Air at +80° F.; Steam Oriented at 200° F. | 770 | 6.58 | 46 |
| 4 | Steam Cooled at 200° F.; Steam Oriented at 200° F. | 830 | 6.11 | 53 |
| 5 | Cooled with $N_2$ at −20° F.; Air Oriented at 80° F. | 770 | 5.80 | 44 |
| 6 | Steam Cooled at 200° F.; Air Oriented at 80° F. | 730 | 5.36 | 47 |

The above data show that relatively high orientation temperatures, i.e. cold drawing temperatures in the range between 150° and 250° F. (about 65° to 120° C.) have a surprisingly beneficial effect on tenacity (see tests 1–4) whereas at low orientation temperatures relatively poor tenacities are obtained. Furthermore, comparison of tests 1 and 2, on the one hand, with tests 3 and 4, on the other hand, shows that the beneficial effect of the high orientation temperatures can be further reinforced by the initial cooling temperatures at which the fiber is cooled when first extruded or spun. Low cooling gas temperatures, between about −40° and +40° F. (−40° to about 5° C.), preferably between −25° and −10° C., definitely contribute toward better fiber tenacity even when the preferred elevated temperature is used in the orientation step. Liquid cooling media will give substantially poorer tenacity, regardless of the temperature of the liquid.

The high cooling rate obtained with a liquid appears to have an adverse effect on the desired type of crystallite formation in the fiber.

Because of the combination of good properties, including the high tenacity made possible by the present invention, the resulting polypropylene fibers can be woven into fabrics that are suitable for car upholstery and seat covers, filter cloth, air gunnery tow targets, outdoor furniture, golf bags, awnings, life rafts, as well as in the formulation of a wide variety of blended yarns and fabrics.

Having described the general nature and advantages of the invention and illustrated it by specific examples, its scope is particularly pointed out in the appended claims which, of course, should be read in the light of the foregoing specification and of the state of the prior art.

The invention claimed is:

1. A process for making improved fibers which comprises extruding a high molecular weight, isotactic, plastic propylene polymer having a crystallinity of 40 to 95%, a density between 0.89 and 0.95 and a melting point between 300° and 340° F., at a temperature in the range of about 392° to 572° F. into filaments, cooling the extruded filament in an inert gaseous medium at a temperature between about −40° to 40° F. and orienting the resulting filaments by drawing at a temperature in the range of about 149° to 248° F. until their initial length is increased by about 600 to 900%.

2. A process according to claim 1 wherein the orientation is effected in air at 175° to 225° F.

3. A process according to claim 1 wherein the orientation is effected in steam at about 200° to 212° F.

(References on following page)

References Cited in the file of this patent

UNITED STATES PATENTS

| | | |
|---|---|---|
| 2,210,771 | Myles et al. | Aug. 6, 1940 |
| 2,210,774 | Perrin et al. | Aug. 6, 1940 |
| 2,252,684 | Babcock | Aug. 19, 1941 |
| 2,351,345 | Kleine | June 13, 1944 |
| 2,468,081 | Koster | Apr. 26, 1949 |
| 2,612,679 | Ladisch | Oct. 7, 1952 |
| 2,674,025 | Ladisch | Apr. 6, 1954 |
| 2,825,721 | Hogan et al. | Mar. 4, 1958 |

FOREIGN PATENTS

| | | |
|---|---|---|
| 456,913 | Canada | May 24, 1949 |

OTHER REFERENCES

"Industrial and Engineering Chemistry," July 1956 (pp. 1152–1161 relied on).